(12) United States Patent
Rangarajan et al.

(10) Patent No.: US 7,187,648 B1
(45) Date of Patent: Mar. 6, 2007

(54) REDUNDANCY IN PACKET ROUTING DEVICES

(75) Inventors: Sampath Rangarajan, Bridgewater, NJ (US); Ram Ayyakad, Freehold, NJ (US); Raghuram A. Devarakonda, Clark, NJ (US); Alexander Pavlovsky, Morganville, NJ (US); Alexander Sarin, Freehold, NJ (US)

(73) Assignee: Ranch Networks, Inc., Morganville, NJ (US)

( * ) Notice: Subject to any disclaimer, the term of this patent is extended or adjusted under 35 U.S.C. 154(b) by 1082 days.

(21) Appl. No.: 10/299,365

(22) Filed: Nov. 18, 2002

Related U.S. Application Data

(60) Provisional application No. 60/333,317, filed on Nov. 26, 2001.

(51) Int. Cl.
*H04J 1/16* (2006.01)
*H04J 3/14* (2006.01)
(52) U.S. Cl. ...................................... 370/216; 370/217
(58) Field of Classification Search ................ 370/216, 370/217, 218, 219, 220, 221; 714/100, 1, 714/2, 3, 4
See application file for complete search history.

(56) References Cited

U.S. PATENT DOCUMENTS

| | | | | |
|---|---|---|---|---|
| 7,072,293 B2* | 7/2006 | Hunter et al. | ................ | 370/218 |
| 2003/0016624 A1* | 1/2003 | Bare | ........................... | 370/217 |
| 2006/0062141 A1* | 3/2006 | Oran | ........................... | 370/216 |
| 2006/0126500 A1* | 6/2006 | Wakai et al. | ................ | 370/218 |
| 2006/0153066 A1* | 7/2006 | Saleh et al. | .................. | 370/216 |

* cited by examiner

*Primary Examiner*—Ajit Patel
(74) *Attorney, Agent, or Firm*—Henry T. Brendzel

(57) ABSTRACT

An arrangement where a primary traffic management device includes ports that are connected to a network, and a backup device that is connected to the primary device and also to the network provides effective backup support. When a port of the primary become non-operational, a port of the backup device is enlisted to serve the function of the non-operational port, leaving the remaining port of the primary, as well as all of the processors to continue operating normally, employing whatever data has been accumulated in the primary. The enlisting is accomplished through a Layer 2 switch within the primary device and a Layer 2 switch within the secondary device.

24 Claims, 3 Drawing Sheets

REDUNDANCY IN PACKET ROUTING DEVICES

RELATED APPLICATIONS

This invention claims priority from Provisional application No. 60/333,317, filed Nov. 26, 2001, which is herein incorporated by reference.

BACKGROUND OF THE INVENTION

This invention relates to routing devices and, more particularly, to redundancy in packet network devices.

A typical TCP/IP network comprises multiple hosts that are interconnected through a variety of traffic management devices such as Ethernet switches, IP routers, firewalls, load balancers and bandwidth limiters that are employed to manage the traffic flow in the network. A failure of any of these devices may result in the loss of network connectivity that cannot be tolerated in mission-critical environments. In order to prevent such network outages, all such devices support a redundant configuration. A redundant configuration may consist of two or more similar devices, in which one device is designated to be the backup device. The backup device is dormant during normal operating condition, in the sense that it does not handle network traffic, but it does monitor the other active device(s). If any of the active devices fail, the backup device switches over to an active mode, and seamlessly takes over the responsibility of the failed device. Having one backup device for every active device provides a high level of confidence that the network will continue to operate in case of failure.

Each of the devices described above handles packets pursuant to information that is found in different headers in the packet. Ethernet switches perform switching of packets based on information in the Layer 2 header of the packets. IP routers perform routing based on information in the of the Layer 3 headers of the packets. Firewall devices, load balancers and bandwidth managers look deeper into the packets and operate on the basis of Layer 3, Layer 4 and application layer information. In general, the deeper the device has to look into the packet, the higher is its operational complexity and the computational cost. Additionally, a device that is operating at a Layer 4 and higher has to maintain a significant amount of state information. The state information is dynamically obtained from the network and is, therefore, not administratively configurable (or configurable with great difficulty).

In conventional arrangements, there is a finite delay before the passive device detects that there is an irrevocable internal failure in the primary device, or that there is a failure at the interface to the primary device, and decides to switch over. Moreover, typically some time is required to properly configure the backup device, and some more time is required for other devices in the network to learn about the switchover. Therefore, a switchover at times results in a loss of packets for a finite amount of time. More importantly, during a switchover, all the dynamic information learnt by the active device is lost. This is quite undesirable because it may lead to a need to restart of ongoing application sessions between the network hosts. This problem becomes even more serious in devices operating at the higher layers, because these devices build very large databases of dynamic information.

SUMMARY

The aforementioned problem with prior art backups is eliminated, and an advance in the art is achieved with an arrangement where a primary traffic management device includes ports that are connected to a network, and a backup device that is connected to the primary device and also to the network. When a port of the primary become non-operational, a port of the backup device is enlisted to serve the function of the non-operational port, leaving the remaining port of the primary, as well as all of the processors to continue operating normally, employing whatever data has been accumulated in the primary. The enlisting is accomplished through a Layer 2 switch within the primary device and a Layer 2 switch within the secondary device.

DETAILED DESCRIPTION

Figure 1:
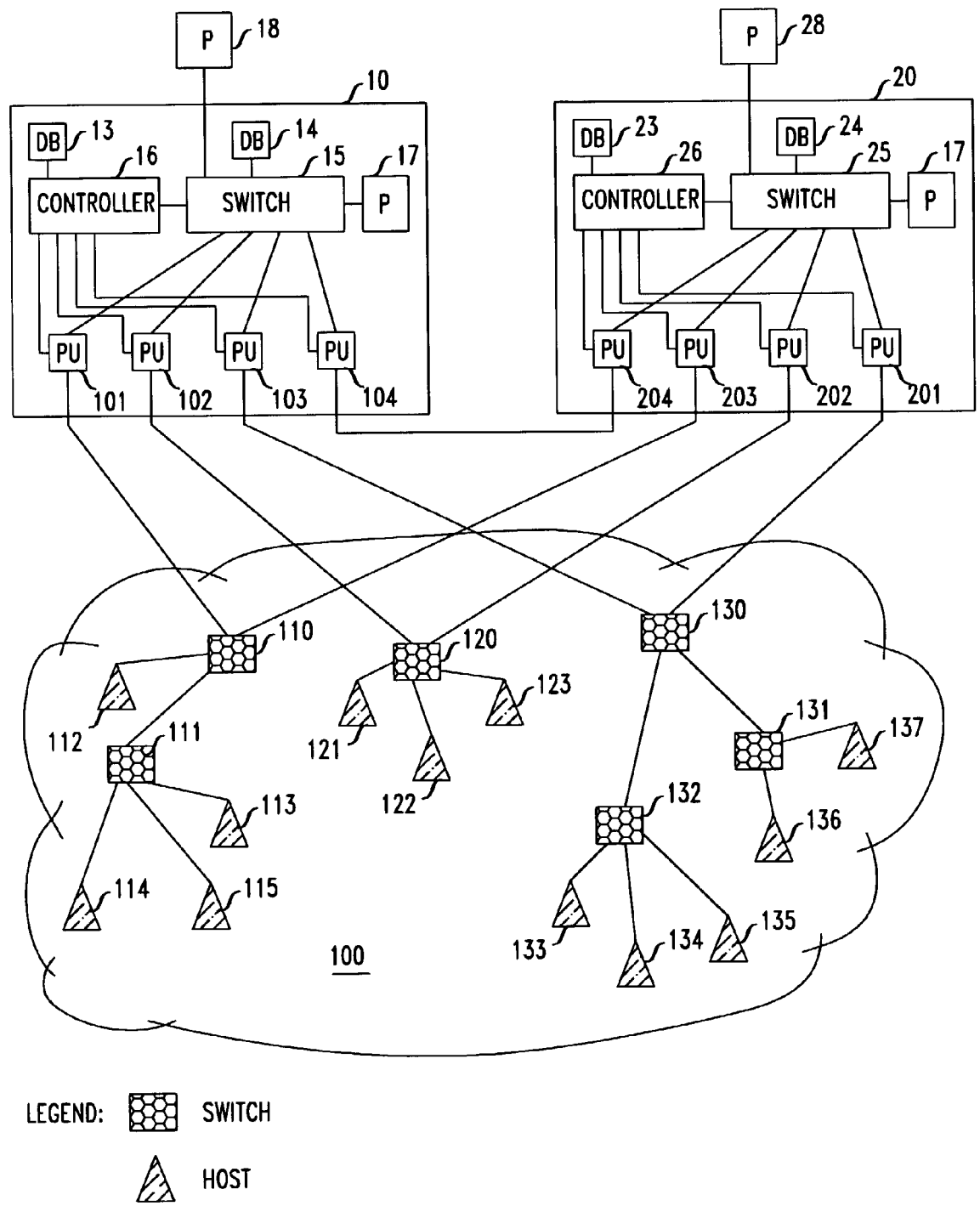
FIG. 1 presents the block diagram of one realization in accord with the principles disclosed herein.

FIG. 1 presents a basic network arrangement that comports with the principles disclosed herein. It depicts an arrangement that includes a packet network 100 and traffic management device 10 that is connected to network 100. Each element within network 100 has an address that is unique to the device, and an address that effectively identifies the device within network 100. The unique device address is often referred to as the Ethernet address, or the MAC (Medium Access Control) address. When network 100 is an IP network, the network address is the IP address. For illustrative purposes, it is assumed herein that network 100 is an IP network.

In its basic form, device 10 includes switch 15, and controller 16 that manages device 10. Device 10 can include an internal processor 17 that is connected to switch 15 and performs various functions that are related to a particular functionality of device 10 (e.g., fire wall, load balancer, bandwidth limiter, etc.), and can similarly include an external processor 18. Controller 16, which has associated database 13, is connected to switch 15, which is coupled to numerous port units, such as port units 101, 102, 103, and 104, and also has an associated database 14. Since port units 101–104 are connectable to network 100, they are termed N ports. Port units 101–103 are actually connected to network 100 in FIG. 1 and, more specifically, port unit 101 is connected to network element 110, port unit 102 is connected to network element 120, and port unit 103 is connected to network element 130.

Switch 15 can be purchased commercially, for example, from Intel Corporation, and the operation of switch 15 is adapted to comport with industry standards. The switch, effectively through a learning function that is described more fully below, populates database 14 and employs the database information to carry out its switching functions. Controller 16 may be a stored program controlled processor and it, too, is conventional.

Device 20 is included in the FIG. 1 arrangement to create a redundancy grouping for device 10. In some applications, it may be possible to employ a device 20 that does not have the full set of capabilities of device 10. However, there clearly are applications where it is desirable to replace device 10 with device 20 and, for those applications, device 20 should be functionally identical to device 10. In FIG. 1, for sake of simplicity, it is assumed that device 20 is constructed identically to device 10.

To provide for the desired redundancy, device 20 also has three ports connected to network 100, that is, to elements 110, 120, and 130. They do not have to be the same respective ports that connect device 10 to network 100, and to illustrate this point, in the FIG. 1 arrangement port unit 203 is connected to network element 110, port unit 202 is connected to network element 120, and port unit 201 is connected to network element 130. Each of the network elements broadcasts the same packets to both device 10 and device 20, and accepts packets from both device 10 and device 20. The IP addresses of devices 10 and 20 are identical. The Ethernet addresses of the elements within devices 10 and 20, however, (e.g., the controller and external/internal processor) do, of course, differ from each other. Lastly, to create the redundancy grouping, at least one port unit of device 10 is connected to a port unit of device 20, and FIG. 1 shows port unit 104 connected to port unit 204. This redundancy crossover (RCo) connection is employed for data traffic between devices 10 and 20, and may also be employed for control traffic between devices 10 and 20.

It is noted that, while the FIG. 1 arrangement has each network element that is connected to device 10 also connected to device 20, this is not a requirement of this invention. It is quite possible to have a connection arrangement where a different set network elements connect to devices 10 and 20, as long as each element within network 100 that needs to be reachable by device 10 is also reachable by device 20.

Each port unit, constructed as is also well known in the art, can have various functional capabilities, depending on the application to which device 10 is applied. For purposes of this invention, each port unit needs to be aware of its operational status (i.e., that a viable connection is maintained to network 100, and that the unit itself is operational). Each port is also connected to controller 16 in order to communicate the operational status to the controller, and be at least responsive to commands from controller 16 that enable, or disable, the port unit relative to network 100 signals.

It should be realized that the principles disclosed herein are applicable to arrangements where the switching function of element 15 is incorporated in a processor, such as the processor of controller 16. Also, a higher-level redundancy than the double modular redundancy shown in FIG. 1 (e.g. triple modular redundancy) might be employed without departing from the spirit and scope of the principles disclosed herein.

In operation, during an initial setup process, a decision is made as to whether device 10 is the "primary" device and device 20 is the "backup" device, or vice versa. Illustratively, this decision can be made based on which device is first to send a status message to the other. Accepting, for sake of exposition, that the setup process chooses device 10 to be the "primary" device, controller 16 enables all of its port units, and controller 26 disables all of its port units that connect to network 100, except the ones that connect to device 10 for purposes of exchanging control messages and the ones that participate in the RCo connections (in FIG. 1, that is port unit 204). In the FIG. 1 arrangement, where the network does not contain distinct Virtual Local Area Networks (VLANs), switching through device 10 can be accomplished strictly within layer 2. That is, a host sends out a packet with the appropriate Ethernet destination address, when the packet arrives at device 10, switch 15 identifies a port for the destination address based on its database, and switches the packet to that output port.

Controller 16 monitors the operational state of device 10, which means that it monitors the operational state of all of the port units within device 20, the operational state of switch 15, and its own operational state. Periodically, it reports on this operational state to controller 26. Correspondingly, controller 26 monitors the operational state of device 20 and periodically reports on this operational state to controller 16. These periodic reports can be communicated through a dedicated connection between controllers 16 and 26, but they can also be communicated via one of the RCo connections. In FIG. 1, for sake of simplicity, these messages are communicated via the single established RCo connection (in which port units 104 and 204 participate).

As indicated above, controllers 16 or 26 may be implemented with stored program controlled processors. All of the controllers' functionalities are then effected through software modules in controllers 16 and 26. While this may be the preferred realization, it should be realized, that some, or even all, of the functionalities required of controllers 16 and 26 may be implemented with one or more hardware modules, implemented conventionally, as is well known to those who are skilled in the art of circuit design. As long as both controllers operate properly, normal operation continues.

It is noted that a problem reported by controller 26 does not affect the normal operation of the FIG. 1 arrangement. However, it is advisable for this condition to be reported to the administrator of the FIG. 1 arrangement so that the malady may be corrected. No other automatic action needs to take place.

One prior art problem that is overcome by practicing the principles disclosed herein is the ability to avoid replacing (automatically) an entire device simply because one or more port units becomes non-operational. By non-operational what is meant is that either the port unit itself, or the connection from network 100 to the port unit, no longer performs as intended. In a commercial embodiment of this invention, where the number of port units significantly larger than 4 (for example, 16) and where some embodiments have an additional internal processor connected to the switch and, perhaps, also an external processor (such processors performing functions that are not intimately related to the Layer 2 operational management of the switch), there may be a significant amount of data that is maintained in the processors and in databases that are associated with those processors, and much of this data is transitory, learnt, data. The ability to replace only the non-operational port units in the primary device and to continue to use the switch, the controller, and the internal and external processors of the primary represents a significant operational advantage of the principles disclosed herein. This is especially true when considering that, in accord with the principles of disclosed herein, one can handle more than one port failure without having to replace device 10.

Figure 3:
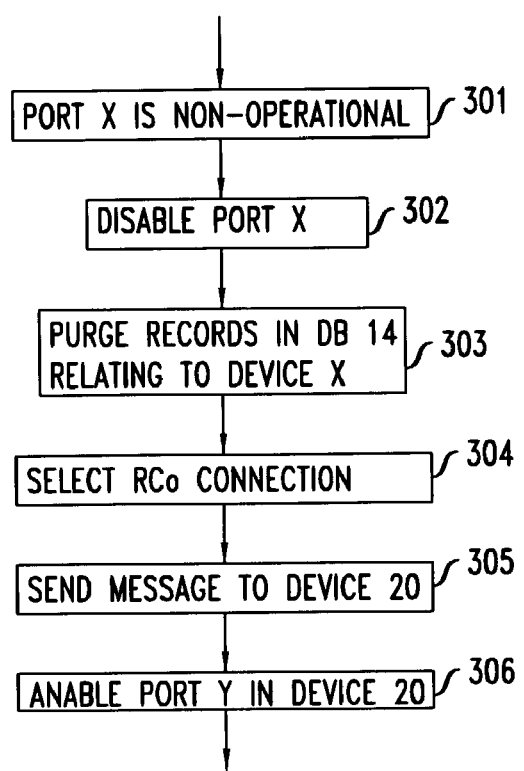
FIG. 3 is a flowchart showing the backup provisioning with a port become non-operational.

In the FIG. 1 arrangement, when, for example, port unit 101 becomes non-operational, the port unit communicates the condition to controller 16, and the process depicted in FIG. 3 is executed. In response to the message received by controller 16 in step 301, step 302 disables port unit 101, and passes control to step 303. Step 303 purges database 14 of all records that indicate switching of packets to port unit 101, and passes control to step 304. What purging the database records means is that those records become inaccessible to the switch. Deleting the data from the database is certainly a purging of the data, but setting a flag in the database can have the same effect. Step 304 chooses one of the available RCo connections and passes control to step 305. Step 305 sends a message to device 20, for example, over the selected RCo connection, which informs controller 26 that port unit 101 was disabled. Controller 26 is aware from the initial administrative setup that the element to which port unit 101 is connected, i.e., element 110, is also the element to which port unit 203 is connected and, in response to the directive, controller 26 in step 306 enables port unit 203. Stated generally, controller 26 enables the port unit that can reach the elements that are no longer reachable by device 10 because port unit 101 was disabled.

When host 121, for example, outputs a packet with the Ethernet address of host 112, the packet enters port 102, but switch 15 is unable to find a record in database 14 that specifies an output port for the packet, because the record (tuple)

"Ethernet address of host 112: port 101"

was purged from the database. Therefore, switch 15 boradcast the packet to all port (other than the port from where the packet came is, and in this manner, the packet reaches its destination. Alternatively, switch 15 may initiate an EAS process, where the requesting element broadcasts a special "ARP" packet that identifies its own Ethernet address and the IP address of the element whose Ethernet address is desired. All traffic management elements that receive this packet rebroadcast the packet and, eventually, the element whose IP address the special packet identifies receives the special packet and sends a response. The response, which contains the element's requested Ethernet address, returns to the network element that made the request, providing the sought information. In this case, switch 15 might execute the EAS process for the IP address of host 112 and, in due course, receives a responsive packet from host 112 via port unit 203, switch 25, port unit 204, and port unit 104. This allows switch 15 to update database 14 with the tuple "Ethernet address of host 112: port 104."

As a byproduct, switch 25 is also able to update its database (24) with the tuple "Ethernet address of host 112: port 203."

Figure 4:
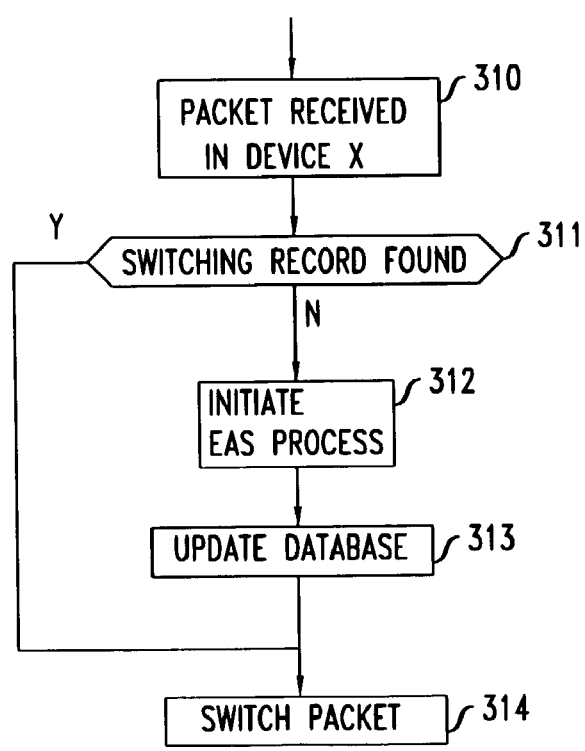
FIG. 4 is a flowchart of the process by which a database within the switch of the primary device in the FIGS. 1 and 2 embodiments effects an update of its database in response to a failed port and the engagement of the backup device.

At this point, switch 15 switches the packet of host 121 to port 104, the packet arrives at port 204 of device 20, switch 25 switches the packet to port 203, and in this manner the packet eventually arrives at host 112, successfully circumventing the non-operational port unit 110. This process is illustrated in FIG. 4, where in step 310 a packet is received at a port of a device (10 or 20), and control passes to step 311. Step 311 ascertains whether the switch in the device that received the packet contains a port specification corresponding to the destination address specified in the packet. If such a port specification is found, control passes to step 314, which switches the packet. Otherwise, control passes to step 312, which initiates the EAS process. Eventually the information sought by the EAS process arrives at the switch and, at step 313, the switch updates its database and switches the packet. In the case of where the device that is initiating the EAS process is device 10, and the reply packet arrives at device 10 via device 20, step 313 includes the step of device 20 updating it database and switching the reply packet to device 10.

Should host 112 send a reply packet to host 121, that packet cannot be accepted at port unit 101 (because it is disabled), but is accepted at port unit 203 (because it is enabled). In those embodiments where switch 25 can be set to route all incoming packets to port unit 204, regardless of destination address, that is done, causing the packet from host 112 to be switched to port unit 204. Alternatively, switch 25 can execute the EAS process and thereby modify its database 24 so that packets that are destined to host 112 would be switched to port unit 204. From port unit 204 the packet reaches port unit 104 and switch 15 where, based on information obtain from database 14, the packet is switched to port 103, and then eventually to host 121.

It is noted that the all packets in the above example pass through port unit 102 within device 10 and through switch 15 of device 10 and, therefore, are accessible to processors 17 and 18, for those applications that call for such access.

Figure 2:
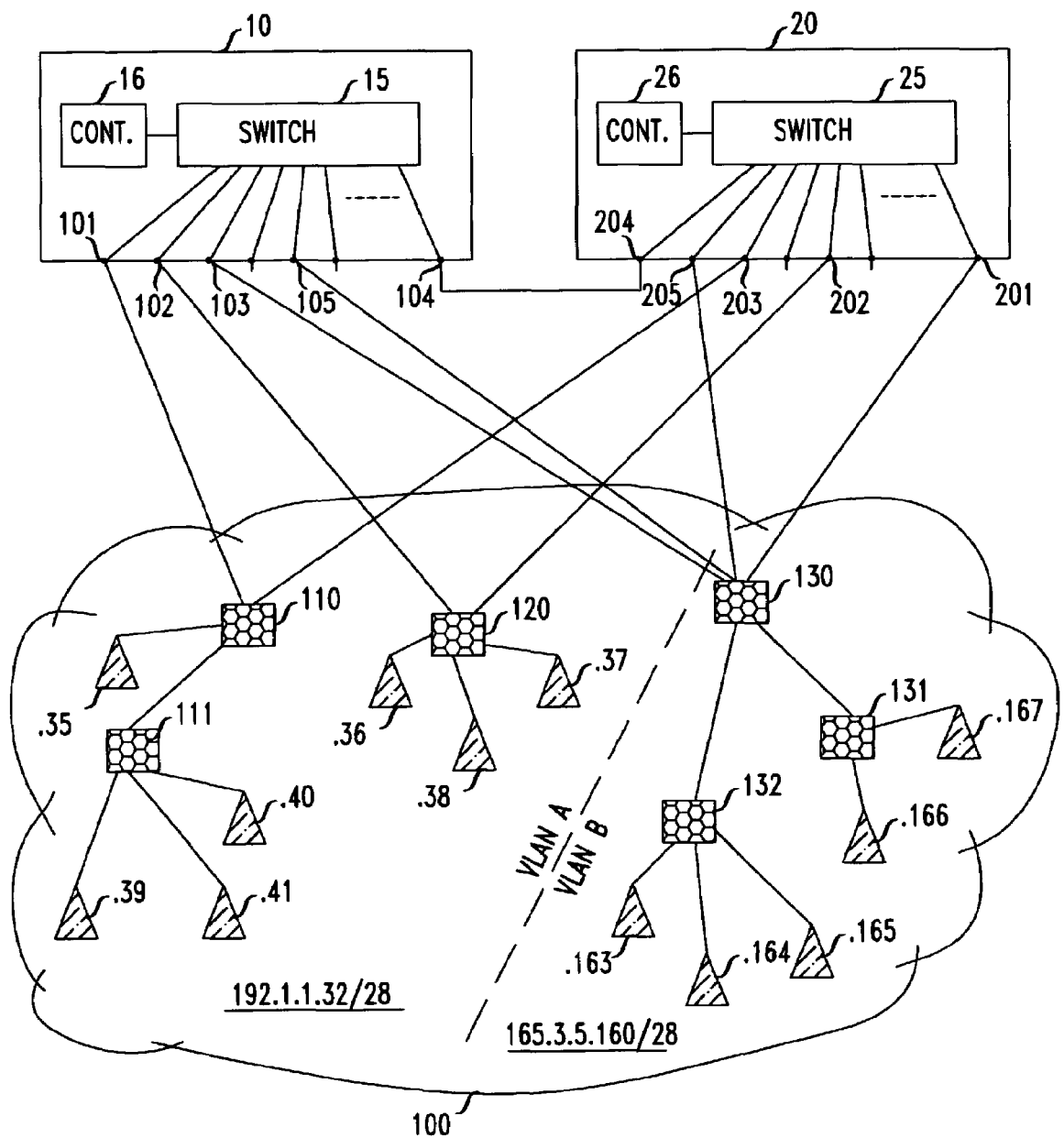
FIG. 2 presents the block diagram of another realization in accord with the principles disclosed herein.

FIG. 2 presents a slightly modified embodiment, where device 10 is shown with less detail, but includes more port units (or, "ports" for short) than the number of ports shown in FIG. 1. For sake of simplicity, the ports are represented by solid dots. Also, network 100 is divided into a VLAN A that includes network elements 110 and 120 and associated switching/routing elements and hosts (e.g., computer, printers, etc.), and a VLAN B that includes network element 130 and associated switching/routing elements and hosts. Illustratively, the IP addresses of VLAN A form subnet 192.1.1.32/28, and the IP addresses of VLAN B form subnet 165.3.5.96/29. The port units are administratively configured for the proper VLANs, which in FIG. 2 means that ports 101 and 102 are configured to belong to VLAN A, and ports 103 and 105 are configured to belong to VLAN B. The same applies to device 20, where ports 203 and 202 are configured to belong to VLAN A, and ports 201 and 205 are configured to belong to VLAN B. The elements within network 100 are labeled in FIG. 2 by their IP addresses.

Device 10 has as many IP addresses as VLANs to which it is connected, and device 20 has the same set of IP addresses. Controller 16 and Controller 26 have their own respective Ethernet addresses. Through prior administrative setting of a default router, all elements in network 100 are given the IP address of device 10 (and device 20), and all elements in network 100 also know the Ethernet addresses of the controllers and the switches within these devices (e.g., through a previously executed EAS process).

When host 192.1.1.35 (35, for short) wishes to communicate with host 192.1.1.37 (37, for short), it constructs a packet that comprises its own IP address and Ethernet address, the IP address of host 37, and the Ethernet address of controller 16. It also identifies the packet as a VLAN A packet, which causes this packet to be accepted only by elements that are configured to be in VLAN A (such as port 101). The packet arrives at controller 16 via port 101 and switch 15, whereupon, the controller consults file db1 within database 13 that associates IP addresses with Ethernet addresses. If it finds the Ethernet address of host 37, it replaces its own Ethernet address with the Ethernet address of host 37 and presents the packet to switch 15. Since host 37 is in the same VLAN, device 10 may inform host 35 of this Ethernet address of device 37 in order to allow host 35 to construct future packets with the proper Ethernet address that will be handled by switch 15 directly. If controller 16 fails to find an appropriate record in db1, it consults file db2 within database 13, which associates IP subnets to VLANs. It determines that host 37 is in VLAN A, and executes the EAS process. In networks that support VLANs, the EAS process requires the "ARP" packets to also specify a VLAN, because it is desirable for the EAS process to be restricted in its search to a specified VLAN. Accordingly, controller 16 sends out an "ARP" packet with a VLAN A specification, this "ARP" packet is broadcast to all ports that belong to VLAN A (including port 102), and host 37 eventually sends a reply, specifying its own Ethernet address. Communication from host 35 to host 37 then proceeds as described above, with each packet specifying VLAN A, the IP address of host 37, and the Ethernet address of host 37. Communication in the reverse direction follows the same process.

It is noted that it is also possible for host 35 to first ascertain that host 37 is in the same subnet. Given the practice that all IP addresses of a subnet belong to the same VLAN, when host 35 determines that host 37 belong to the same subnet as it does, host 35 knows that the Ethernet address of host 37 can be obtained by it executing the EAS process (rather than requesting device 10 to do it).

When host 35 wishes to communicate with host 165.3.5.166 (166, for short), which is in a different VLAN, the EAS process cannot be used by host 35 to obtain the Ethernet address of host 166 because packets with a VLAN B specification cannot be routed through VLAN A. Therefore, host 35 proceeds to engage the routing services of device 10 as described above. As disclosed above, controller 16 references file db1 and determines that host 166 is in VLAN B. Cloaked in its VLAN B persona, controller 16 initiates an EAS process, which broadcasts an "ARP" packet to all ports that belong to VLAN B. At least one of these ports (e.g., port 103) returns a reply packet that contains the Ethernet address of host 166. Thereupon, switch 15 updates its database 14 with the tuple VLAN B: Ethernet address of host 166: port 103 and file db1 of database 13 is updated with the tuple

IP address of host 166: Ethernet address of host 166.

In practice, database 14 is partitioned by VLANs, so that the update in database 14 is to the VLAN B partition, and the tuple comprises only the fields Ethernet address of host 166: port 103.

As an aside, if it is determined that searching through two small database files is quicker than searching through one larger database file, file db 1 can be also partitioned into subnets.

Communication from host 35 to host 166 continues, with host 35 sending out packets that contain the IP address of host 166 and the Ethernet address of controller 16, controller 16 identifies the Ethernet address of host 166 and the fact that host 166 is in VLAN B, modifies the received packet to change it to a VLAN B packet with the Ethernet address of host 166, and presents it to switch 15. Switch 15 routes the packet to port 103, from where the packet is sent to host 166.

Communication in the opposite direction, from host 166 to host 35, follows the same process.

When, for example, port 101 fails, this information is communicated to controller 16, which, as indicated above, disables port 101, and purges all records in the database 14 of all records that relate to port 101. If more than one such port is available chooses a redundancy backup (RB) port (in FIG. 2, only port 104 is an RB port), configures the chosen RB port to belong to the same VLAN to which the disabled port belonged (here, VLAN A), and sends a message to controller 26. The message provides the identity of the network element to which the disabled port is connected, and identity of the chosen RB port. From its own configuration tables controller 26 identifies the port that can reach the network elements that can no longer be reached by the disabled port 101 (here, port 203), determines the administratively configured VLAN of that port (i.e., VLAN A), and enables that port. Controller 26 also identifies the port that is connected to the specified RB port (here, port 204) and configures that port to belong to the same VLAN as the enabled port (here, VLAN A). As an aside, a port such as RB ports 104 and 204 can be configured to belong to more than one VLAN.

When host 35 casts a packet destined to host 166, it comprises the IP address of host 166 and the Ethernet address of controller 16 (in addition to its own IP address and Ethernet addresses). The packet is broadcast to ports 101 and 203 by network element 110, but port 101 is disabled. However, since port 203 is enabled, the packet is received by port 203. Switch 26 notes the Ethernet address of the packet (that being the Ethernet address of controller 16), updates its database with the tuple Ethernet address of host 35: port 203 and, following a lookup at its database, switches the packet to port 204. Note that since ports 204 and 104 are configured to belong to VLAN A, the packet encounters no problems. The packet arrives at switch 15, allowing it to update its database 14 with the tuple Ethernet address of host 35: port 104.

In this illustrative example, the sole function that is expected from device 10 is a routing of the packet. Accordingly, controller 16 proceeds as described above to route the packet to host 166 via port 103, that is, without interaction with processors 17 and 18 (which are explicitly depicted in FIG. 1).

In the opposite direction, when host 166 wishes to send a packet to destination host 35, it constructs a packet that contains the IP address of device 10 that belongs to the VLAN of host 166, for example, 165.3.5.200, the Ethernet address of controller 16, and the IP address of destination host 35. This packet is designated as a VLAN B packet. The packet arrives at controller 16 via port 103, and switch 15 switches the packet to controller 16. Controller 16 replaces the VLAN B designation of the packet with the VLAN A designation, replaces its own Ethernet address with the Ethernet address of host 35, and presents the packet to switch 15. Switch 15 switches the packet to port 104, the packet arrives at port 204, and switch 25 switches the packet to port 203, from where the packet is routed to host 35.

In the above example, host 35 tried to reach host 166 first, and that action populated database 14 following the aforementioned purging. If, however, host 166 attempted to reach host 35 first, when controller 16 eventually presents a packet to switch 15 that comprises the Ethernet address of host 35, switch 15 would not be able to find a corresponding port, because all records of port 101 were purged from database 14 (which previously contained a tuple that associated the Ethernet address of host 35 with port 101). This packet is broadcast to all ports of device 10 that belong to VLAN A, which includes ports 102 and 104. From port 104 the packet arrives at port 204, then arrives at switch 25, and is broadcast by switch 25 to all ports that belong to VLAN A, which includes port 203. Eventually, a reply packet arrives from host 35 to port 203. Switch 25 updates its database (which corresponds to database 14), switches the reply packet to port 204, and switch 15 receives the reply packet and updates its database 14. Thereafter, the packet presented by controller 16 is switched based on the newly acquired information.

Multiple malfunction conditions can be taken care of in a similar fashion. To illustrate, assume that host 192.1.1.41 is communicating with host 165.3.5.163, that port 101 went down a while ago, and that port 103 goes down now. In accordance with the principles disclosed herein, port 101 was disabled, port 203 was enabled, port 104 was designated to belong to VLAN A, and port 204 was also designated to belong to VLAN A. Database 14 was purged of all entries that relate to port 101, and some new entries have been installed that involve port 104; for example, Ethernet address of host 41: port 104.

Correspondingly, some entries have been installed in the database 24 that involve port 203.

When port 103 goes down, controller 16 disables port 103, designates port 104 to belong to VLAN B (in addition to it belonging to VLAN A), purges database 14 of all entries that involve port 103, and sends a message to controller 26. Controller 26 designates port 204 to belong to VLAN B (in addition to it belonging to VLAN A), and enables port 201.

A packet from host 163 having the destination IP address of host 41 and the Ethernet address of controller 16 is accepted at port 201. Switch 25 updates database 24 with the tuple Ethernet address of host 163: port 201 and switches the packet to port 204, through which the packet arrives at switch 15 via port 104. Switch 15 updates its database 14, with the tuple Ethernet address of host 163: port 104 and switches the packet to controller 16. Assuming that controller 16 finds the record that corresponds to host 41, it presents a packet that specifies VLAN A and the Ethernet address of host 41. From the previous modifications, in response to a non-operative condition at port 101, the packet is switched to port 104, arrives at switch 25 via port 204, and is switched to port 203. Thus, a packet from host 167 to host 41 travels to device 20, is switched from port 201 to port pair 104–204, arrives at controller 16, is returned (with a different VLAN designation to port pair 104–204, and again arrives at switch 25, where it is switched to port 203.

In order to insure proper operation in connection with packets that flow though the RCo connection of ports 104 and 204, it is necessary to know the VLAN of packets that arrive at switches 15 and 25. To that end, ports 104 and 204 are configured to place an explicit VLAN designation in all packets that are to be communicated across the RCo connection, if the VLAN designation is not already there. This is effected through interaction with the controller that is internal to switch 15 (or to switch 25, respectively), which is already adapted to determine the VLAN of a port from which a packet is switched and the VLAN of the port to which a packet is switched, and to make sure that a packet is not switched between two ports that belong to two different VLANs. Thus, for example, knowing that a packet is being switched from port 101, information is available for port 104 to tag a packet that is switched to port 101 to port 104 with the VLAN of port 101, that is, VLAN A.

It is noted that the connection point of switch 15 to controller 16 is, effectively, merely another port of switch 15. Packets can be switched to this port, and switched from this port. The same applies to processors 17 and 18, although a skilled artisan would readily appreciate that processors 17 and 18 can be connected directly to controller 16, rather than to switch 15.

It is noted that the RCo connection employing only ports 104 and 204 multiplexes packet stream. A first packet stream is the control packets that periodically flow between controller 26, which report on the respective operational health of devices 10 and 20. A second packet stream (though it is hoped that it is a rare packet, rather than a steam) is the control messages at time of detected failures. The third stream is the data packets that flow when the backup functionality is in effect. When two or more ports are non-operative, the bandwidth of this connection is shared between the two or more such data streams. When it is desired to reduce the burden of this time sharing and/or when it is desired to provide a backup for the RCo connection, another one or more pairs of RB ports can be assigned to handle RCo connections. In effect, one can have a trunk connection between devices 10 and 20, comprising a plurality of lines.

Regardless of the number of lines in the RCo connections trunk, there may come a point where controller 16, switch 15, processor 17 or processor 18 fail, or when it is deemed that the number of non-operational lines exceeds a predetermined threshold. In such an event, the entire device 10 is taken off line, and the set of functions that are being executed by device 10 and its associated processors are migrated to device 20. Of course, in such an event there may be a loss of functionality for a short time, while the transitory data that is contained in the various databases that are associated with device 20 is built up, or learnt.

The above discloses that the periodic messages that are sent to and from controller 16 are sent over port 104. It should be realized that a separate, additional, port of device 10 and 20 (connected directly to the respective controllers) can be employed for this purpose, reducing the burden on the RCo connection of ports 104 and 204.

The above also discloses that device 10 is employed in routing calls between different VLANs. It should be realized that the notion of routing calls via device 10, meaning that packets are sent to device 10 with the IP address of the destination element and with the IP Ethernet address of device 10, rather than with the Ethernet address of the destination element, can be maintained even in the absence of VLANs.

The invention claimed is:

1. Apparatus comprising:
 a controller;
 a switch having a plurality of M ports, comprising one controller port that connects said switch to said controller, and not more than M-1 N ports that connect to ports of said apparatus, said switch detects a non-operational condition at any of said ports, and to report said condition to said controller;
 a database associated with said switch that contains records that associate addresses with ports of said switch;
 said controller including first means for determining operational state of said apparatus and for periodically sending a reporting message to outside said apparatus relating to said operational state of said apparatus; and
 said controller including second means for disabling any N port when a non-operational condition is detected in connection said N port, and for purging said database of all records that relate to said N port.

2. The apparatus of claim 1, performing traffic management.

3. The apparatus of claim 2, providing fire wall functionality, or bandwidth control functionality.

4. The apparatus of claim 1 where said second means sends a message indicative of said disabling.

5. The apparatus of claim 4 where said message is sent via one of said N ports.

6. The apparatus of claim 1 where said first means reports said operational state of said apparatus via one of said N ports.

7. The apparatus of claim 1 where said switch is a packet switch, adapted to receive packets and to switch a received packet based on a destination address in said packet, to a port specified in said database for said destination address.

8. The apparatus of claim 7 where said destination address is an Ethernet address, a MAC address, or a unique address of a particular element.

9. The apparatus of claim 7 further comprising a third means for initiating an EAS process.

10. The apparatus of claim 9 where said third means initiates said EAS process when an accessible record is not found in said database that specifies an N port for said destination address.

11. The apparatus of claim 1 further comprising a processor connected to one of said ports.

12. The apparatus of claim 1 where each of said N ports is configured for a VLAN.

13. The apparatus of claim 1 where said N ports are configured for zero, one, or more VLANs.

14. The apparatus of claim 1, constituting an device A, further comprising:
a second instance of said apparatus of claim 1, constituting device B; and
a connection trunk including at least one RCo connection, each RCo connection connecting one N port of said device A to one N port of said device B;
where said first means and said second means of said device A send their respective messages to said device B.

15. The apparatus of claim 14 where said first means and said second means of said device A send their respective messages to said device B via said RCo connection.

16. The apparatus of claim 14 where said N ports that participate in said RCo connection are configured to belong to a given VLAN.

17. The apparatus of claim 14 where said N ports that participate in said RCo connection are configured to belong to more than one VLAN.

18. The apparatus of claim 14 where said first means of said second instance of said apparatus sends its reporting message to said first instance of said apparatus.

19. The apparatus of claim 1 further comprising a first database associated with said controller that maintains records of IP addresses and associated hardware addresses.

20. The apparatus of claim 19 where said third means initiates said EAS process when a packet that specifies an IP address is received at said controller and said first database has no accessible record that identifies a hardware address that is associated with said IP address of said packet.

21. The apparatus of claim 19 further comprising a second database associated with said controller that maintains records of IP address subnets and VLANs.

22. A arrangement comprising:
a primary device that includes a plurality of port units that may fail, as well as at least one database of information and at least one processor that operates with aid of said information and is coupled to said port units;
a secondary device coupled to the primary device; and
a unit in said primary device that interacts with a unit in said secondary device to effect a transfer of operational functionality from port units in said primary device that fail to port units in said secondary device, in a manner that nevertheless maintains full functionality of said at least one processor of said primary device.

23. The arrangement of claim 22 where said transfer effectively replaces a failed port in said primary device with a port of said secondary device, through said coupling between said primary device and said secondary device.

24. An arrangement comprising:
a primary device that includes a plurality of units that may fail, as well as at least one database of information and at least one processor that operates with aid of said information and is coupled to said units;
a secondary device coupled to the primary device; and
means that replaces a failed unit in said primary device with a unit in said secondary device that provides functionality lost by failure of said failed unit, while continuing to operate un-failed units of said primary device, with augmentation of said unit in said secondary device that replaces said failed unit in said primary device.

* * * * *